United States Patent
Rothacher et al.

(10) Patent No.: US 7,770,433 B2
(45) Date of Patent: Aug. 10, 2010

(54) HUMIDITY DETECTOR FOR DETECTING FOGGING ON A WINDOW

(75) Inventors: Urs Rothacher, Zürich (CH); Felix Mayer, Stäfa (CH); Moritz Lechner, Stäfa (CH); Vincent Hess, Zürich (CH)

(73) Assignee: Sensirion AG, Stafa (CH)

( * ) Notice: Subject to any disclaimer, the term of this patent is extended or adjusted under 35 U.S.C. 154(b) by 486 days.

(21) Appl. No.: 11/807,711

(22) Filed: May 29, 2007

(65) Prior Publication Data

US 2008/0016945 A1 Jan. 24, 2008

Related U.S. Application Data

(60) Provisional application No. 60/833,946, filed on Jul. 27, 2006.

(30) Foreign Application Priority Data

Jul. 19, 2006 (EP) .................. 06015010

(51) Int. Cl.
 *G01N 5/02* (2006.01)

(52) U.S. Cl. ............... 73/29.05; 73/1.45; 73/335.01; 250/208.1

(58) Field of Classification Search ............ 73/29.05, 73/335.01, 1.45; 250/208.1
See application file for complete search history.

(56) References Cited

U.S. PATENT DOCUMENTS

| | | | |
|---|---|---|---|
| 4,347,550 A | 8/1982 | Rockliff | |
| 4,651,121 A | 3/1987 | Furubayashi et al. | |
| 4,656,455 A * | 4/1987 | Tanino et al. | 338/35 |
| 5,065,625 A * | 11/1991 | Nakagawa et al. | 73/335.02 |
| 5,568,977 A | 10/1996 | Gschwind et al. | |
| 6,351,390 B1 | 2/2002 | Mayer et al. | |
| 6,395,585 B2 | 5/2002 | Brandl | |
| 6,422,062 B1 | 7/2002 | King et al. | |
| 6,470,696 B1 | 10/2002 | Palfy et al. | |
| 6,690,569 B1 | 2/2004 | Mayer et al. | |
| 6,750,522 B1 | 6/2004 | Mayer et al. | |
| 6,809,530 B2 | 10/2004 | Schmitt et al. | |
| 6,888,465 B2 | 5/2005 | Schmitt et al. | |

(Continued)

FOREIGN PATENT DOCUMENTS

DE 10325971 12/2004

(Continued)

OTHER PUBLICATIONS

SAE 2001 World Congress, Detroit, Michigan, Mar. 5-8, 2001—2001-01-0585, "Development and Application of an Integrated Dew Point and Glass Temperature Sensor", Thomas M. Urbank et al.

*Primary Examiner*—Hezron Williams
*Assistant Examiner*—Rodney T Frank
(74) *Attorney, Agent, or Firm*—Cooper & Dunham LLP

(57) ABSTRACT

The humidity detector comprises a housing adapted to hold a humidity sensor towards the windscreen of a vehicle or any other type of window. A flexible printed circuit board is arranged between the humidity sensor and the windscreen and provides a connection between the humidity sensor and further circuitry of the detector. The humidity sensor is located under a cap, which is engaged by a glider member. A spring pushes the glider member towards the windscreen.

13 Claims, 3 Drawing Sheets

U.S. PATENT DOCUMENTS

| | | |
|---|---|---|
| 7,028,531 B2 | 4/2006 | Nikolaus |
| 7,231,815 B2 * | 6/2007 | Kanare ................... 73/73 |
| 7,392,838 B2 * | 7/2008 | Errington et al. .......... 165/204 |
| 7,405,669 B2 * | 7/2008 | Pflugl ................... 340/602 |
| 7,461,551 B2 * | 12/2008 | Kataoka et al. .......... 73/335.01 |
| 2001/0023087 A1 | 9/2001 | Brandl |
| 2003/0086475 A1 | 5/2003 | Schmitt et al. |
| 2003/0140681 A1 | 7/2003 | Nikolaus |
| 2006/0004494 A1 * | 1/2006 | Errington ................ 701/1 |
| 2006/0207325 A1 * | 9/2006 | Kataoka et al. .......... 73/335.01 |
| 2008/0121034 A1 * | 5/2008 | Lynam et al. ........... 73/335.05 |

FOREIGN PATENT DOCUMENTS

| | | |
|---|---|---|
| EP | 1306242 | 5/2003 |
| WO | 0158731 | 8/2001 |
| WO | 2004108447 | 12/2004 |

* cited by examiner

HUMIDITY DETECTOR FOR DETECTING FOGGING ON A WINDOW

CROSS REFERENCE TO RELATED APPLICATIONS

This application claims the priority of European patent application 06015010.9, filed Jul. 19, 2006, as well as of U.S. provisional application 60/833,946, filed Jul. 27, 2006 the disclosures of which are incorporated herein by reference in their entirety.

BACKGROUND OF THE INVENTION

The invention relates to a humidity detector for detecting fogging on a window, in particular a windscreen. The invention also relates to a method for mounting such a humidity detector.

Typically, such detectors comprise a humidity sensor arranged in a housing and mounted in thermal contact to the windscreen.

Detectors of this type are disclosed in WO 01/58731 and EP 1 306 242. Their humidity sensor is typically adjacent to or in a gap of a rigid printed circuit board and electrically connected thereto. Thermally conductive tape or a metal plate is used for thermally connecting the humidity sensor to the windscreen. Special placing and mounting techniques are required for manufacturing such detectors.

BRIEF SUMMARY OF THE INVENTION

It is an object of the present invention is to provide a humidity detector with a simple design that can be manufactured easily.

Now, in order to implement these and still further objects of the invention, which will become more readily apparent as the description proceeds, the humidity detector for detecting fogging on a window, in particular on a windscreen, comprises
 a housing having a bottom side for facing the window and
 a humidity sensor for detecting a humidity level in ambient air,
 said humidity detector being characterized by
 a printed circuit board forming at least part of said bottom side, wherein said humidity sensor is arranged at a top side of said printed circuit board and connected thereto.

In a second aspect, the invention relates to a humidity detector for detecting fogging on a window, in particular on a windscreen, comprising
 a housing having a bottom side for facing the window and
 a humidity sensor for detecting a humidity level in ambient air, and
 a flexible printed circuit board forming at least part of said bottom side, wherein said humidity sensor is arranged at a top side of said printed circuit board and connected thereto.

Accordingly, a printed circuit board (PCB) is provided forming at least part of the bottom side of the detector. The humidity sensor is arranged at the top side of the printed circuit board and connected thereto. This design allows to position the sensor accurately on the printed circuit board using conventional placement techniques, whereupon the detector can be mounted to the window. The PCB provides a good thermal contact between the sensor and the window.

In a particularly advantageous embodiment, the PCB is a flexible PCB, which provides a particularly good thermal contact between the window and the humidity sensor while adapting well to the surface of the potentially curved window.

Advantageously, a cap is arranged on top of the humidity sensor, with the humidity sensor being located between the PCB and the cap. Such a cap protects the sensor and allows to apply a mechanical force thereto for pushing it against the window.

The invention also relates to a method for mounting the claimed humidity sensor by affixing the humidity detector in a car in a position where the printed circuit board is in thermal contact with the window, i.e. the PCB touches the window. Advantageously, a surface of the PCB directly opposite to the humidity sensor touches the window, thereby providing a good thermal connection between sensor and window.

The invention is particularly suited for detecting the fogging of a windscreen in a car, but may also be used to detect fogging on other types of windows.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE INVENTION

Before providing a detailed description, some definitions are required.

A "flexible printed circuit board", also called a "flex circuit", is a flexible carrier carrying conductor lines (runs) on one or both sides, in single or multiple layers. Typically, the carrier is made of a plastic material, such as DuPont's® Kapton® polyimide film of some 10 to some 100 µm thickness. The flexible printed circuit board is flexible in the sense that it can be bent to a radius of some mm to 1-2 cm without being damaged.

The designation "bottom" describes the side or direction of the detector facing the windscreen (or any other type of window), while the designation "top" describes the side or direction opposite thereto.

Figure 1:
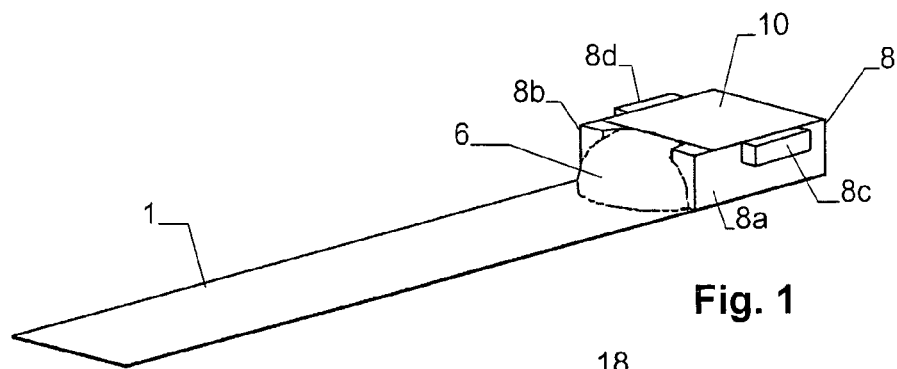
FIG. 1 the humidity sensor, its cap and the flexible PCB,
FIG. 2 the assembly of FIG. 1 with attached glider member and spring,
FIG. 3 the assembly of FIG. 2 with a first part of the housing,
FIG. 4 the assembly of FIG. 3 with a second part of the housing,
FIG. 5 a longitudinal, vertical sectional view of the assembly of FIG. 4 with an adjacent third housing part,
FIG. 6 a frontal, vertical sectional view of the assembly of FIG. 4, and
FIG. 7 a device with an alternative design of the cap.
Figure 2:
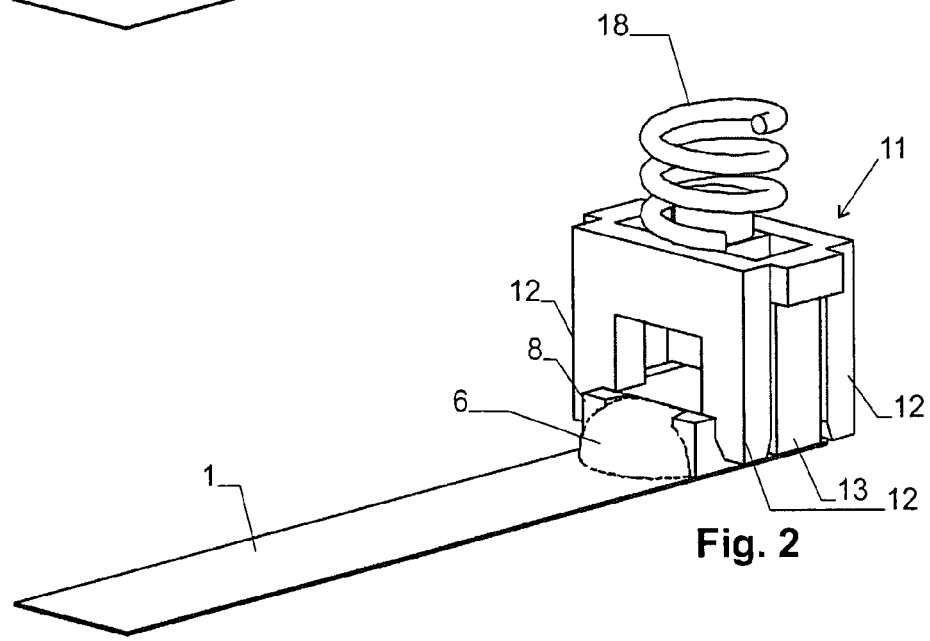
Figure 3:
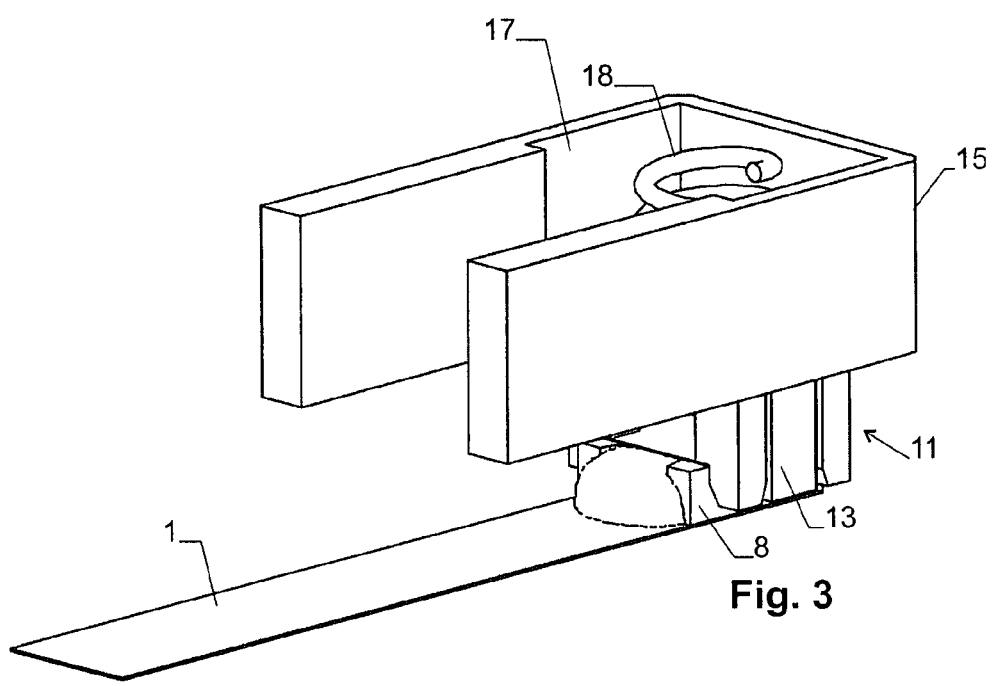
Figure 4:
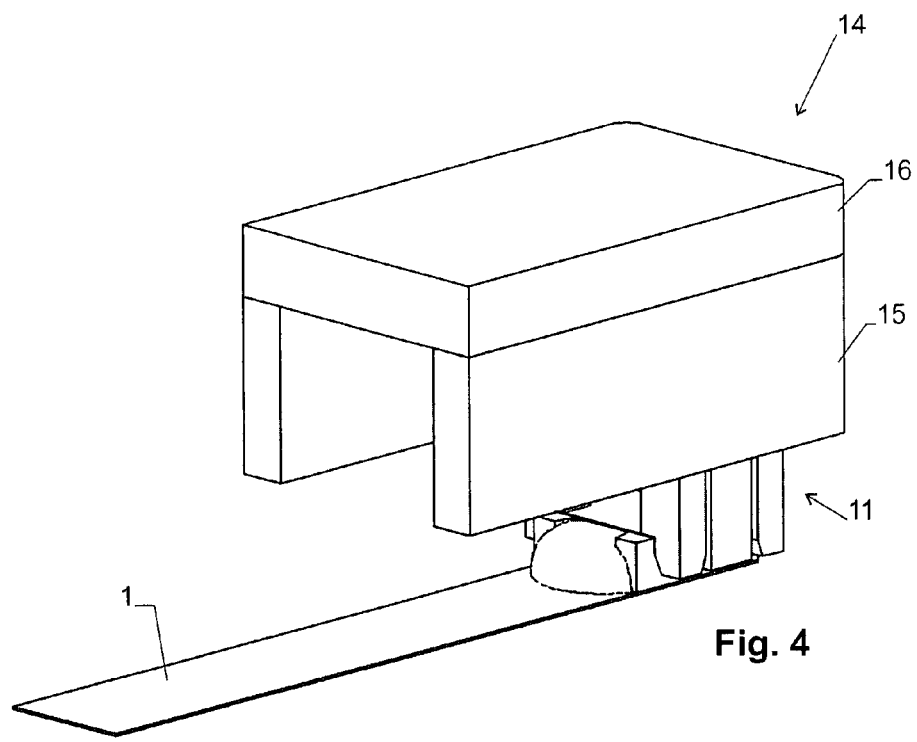
Figure 5:
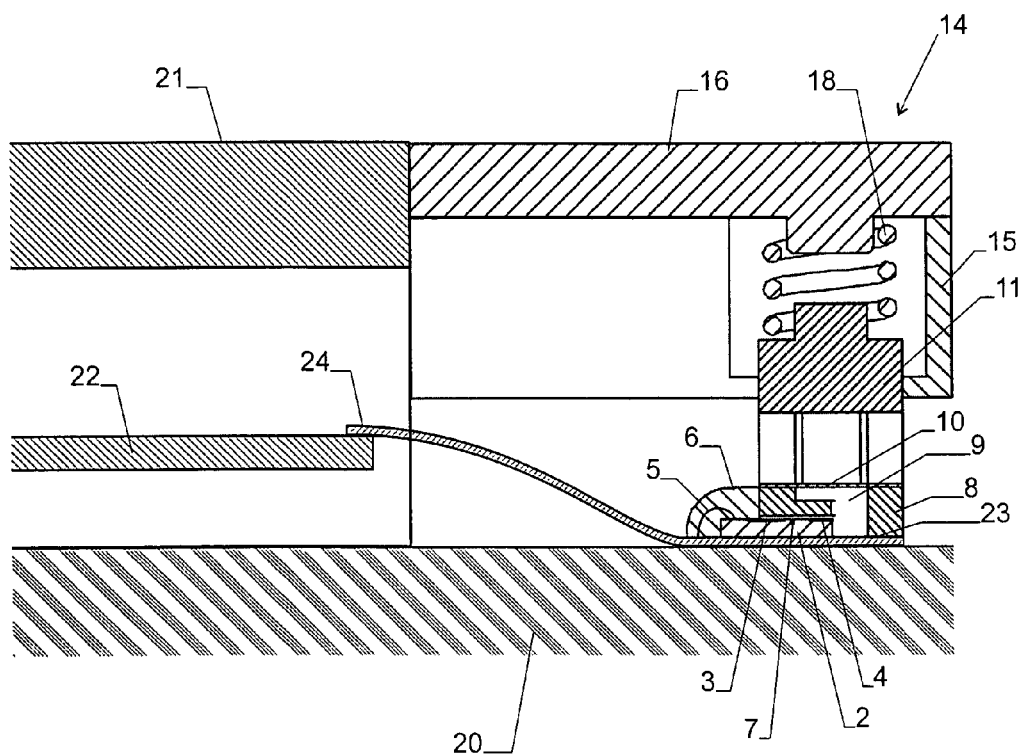
Figure 6:
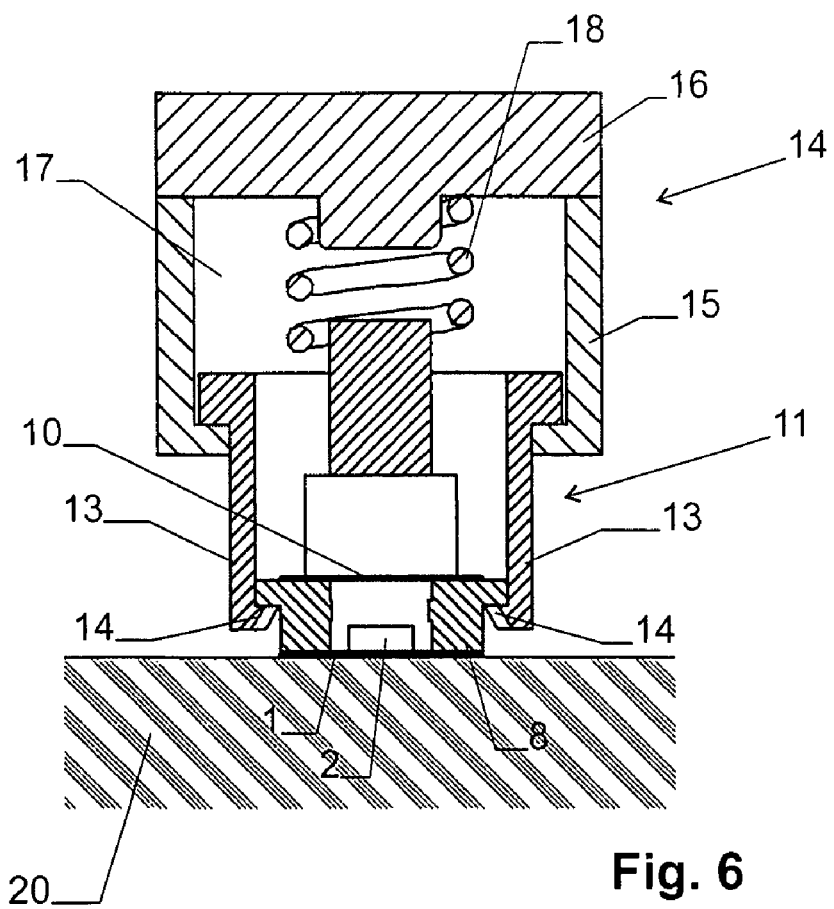

FIGS. 1 to 4 show the humidity detector in various stages of its assembly, while FIGS. 5 and 6 show the complete detector mounted to the windscreen of a vehicle or to any other type of window (such as a side or rear window of a vehicle or the window of a building). As can be seen, the detector comprises a flexible PCB 1. The shape and size of flexible PCB 1 varies depending on the mechanical design of the detector but has the form of an elongate rectangle in the embodiment shown in the figures.

At one end of flexible PCB 1, a humidity sensor 2 is mounted to the top side thereof, as can e.g. best be seen from FIGS. 5 and 6. Advantageously, humidity sensor 2 is attached to flexible PCB 1 by means of gluing, albeit other means of attachment could be used as well.

As shown in FIG. 5, humidity sensor 2 comprises advantageously a semiconductor substrate having a having a top side carrying integrated circuitry 3 and a moisture-sensitive layer 4. An advantageous embodiment of such a sensor is e.g. disclosed in U.S. Pat. No. 6,690,569. Humidity sensor 2 detects the humidity level of the ambient air.

Wires 5 are bonded to contact pads on the top side of humidity sensor 2 and to the runs on flexible PCB 1. A self-hardening resin 6 is cast over the wires 5 for protecting them.

In addition to a humidity-sensitive layer 4, humidity sensor 2 advantageously comprises a temperature sensor, schematically depicted under reference numeral 7. It allows to measure the windscreen temperature accurately. Integrated circuitry 3 comprises an interface that allows the temperature measured by temperature sensor 7 as well as the humidity measured by humidity-sensitive layer 4 to be read by an external system, which allows the external system to make accurate prediction of the fogging behavior of the windscreen.

A cap 8 is arranged on top of humidity sensor 2. Cap 8 rests on the top side of flexible PCB 1 and is e.g. glued or soldered thereto. Furthermore, it is bonded to resin 5. It is made of a rigid material, such as cast plastic and has two lateral side walls 8a, 8b (see FIG. 1), each of which carries a projection 8c, 8d. An opening 9 at the top side of cap 8 allows an air exchange between humidity sensor 2 and its environment. Opening 9 is spanned by an air-permeable membrane 10, e.g. made of porous PTFE, for preventing non-gaseous contaminants from reaching humidity sensor 2.

A glider member 11 is located on top of cap 8. It is e.g. also made from a single cast plastic piece. It is of substantially rectangular shape and has four legs 12 (see FIG. 2), which rest against the top side of cap 8, as well as two flexible arms 13. The flexible arms 13 have inward projections engaging the projections 8c, 8d of cap 8 (see FIG. 6), thereby rigidly mounting cap 8 to glider member 11.

It must be noted that glider member 11 can be adapted to the mechanical design of the humidity detector, while cap 8 can have the same shape of various types of humidity detectors. Hence, by designing cap 8 and glider member 11 as separate parts with a defined mechanical interface, the same assembly of humidity sensor 2 and cap 8 can be used for a variety of different humidity detectors.

Glider member 11 is slideably arranged in a housing 14 of the humidity detector. In the embodiment of FIGS. 1-6, glider member 11 is located in a part of housing 14 formed by a first housing section 15 and a second housing section 16. First housing section 15 forms a vertical shaft 17 (see FIGS. 3 and 6) providing lateral guidance to glider member 11. Second housing section 16 forms a lid on top of shaft 17. A spring 18 is arranged between second housing section 16 and glider member 11. It urges glider member 11 towards the bottom side of the humidity detector and thereby pushes humidity sensor 2 towards the windscreen 20, thereby providing a good thermal contact even for curved windscreens.

Instead of using a spring, any other suitable biasing means can be used for urging glider member 11 towards the bottom side of the detector.

As can best be seen from FIG. 5, housing 14 advantageously comprises a third section 21, which is directly or indirectly attached to windscreen 20. It typically encloses an electronic assembly 22 comprising further circuitry, such as a rain detector and/or interface circuits. It holds first and second housing sections 15, 16 fixedly in respect to windscreen 20 thus that the action of spring 18 presses humidity sensor 2 against the windscreen's inner surface.

Typically, electronic assembly 22 is mounted at a certain distance from windscreen 20. As can be seen From FIG. 5, flexible FCB 1 extends from a first position 23 at the bottom side of the humidity detector below humidity sensor 2 to a second position 24 at a distance from the bottom side of the detector. Hence, flexible PCB 1 allows a quick, simple and adaptable connection of humidity sensor 2 to electronic assembly 22.

Figure 7:
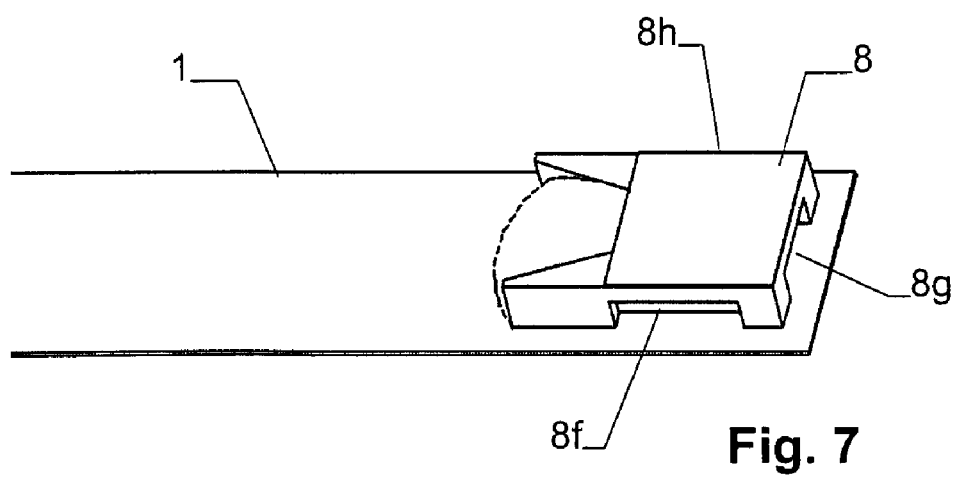

The present invention can be adapted to various detector designs. Also, the design of the different components can vary. For example, FIG. 7 shows an alternative design of cap 8, where the projections 8c, 8d have been replaced by recesses 8f, 8g, 8h, which again can be engaged by the flexible arms of glider member 11.

While there are shown and described presently preferred embodiments of the invention, it is to be distinctly understood that the invention is not limited thereto but may be otherwise variously embodied and practised within the scope of the following claims.

The invention claimed is:

1. A humidity detector for detecting fogging on a window, in particular on a windscreen, comprising
a housing having a bottom side for facing the window and a humidity sensor for detecting a humidity level in ambient air,
a printed circuit board forming at least part of said bottom side, wherein said humidity sensor is arranged at a top side of said printed circuit board and connected thereto, and
a cap arranged on top of said humidity sensor and resting on the top side of said printed circuit board, said cap having an opening spanned by an air-permeable membrane for allowing an air exchange between said humidity sensor and an environment, wherein said humidity sensor is located between said printed circuit board and said cap.

2. The humidity detector of claim 1 wherein said humidity sensor is glued or soldered to the top side of said printed circuit board.

3. The humidity detector of claim 1 wherein said humidity sensor comprises a semiconductor substrate having a top side carrying integrated circuitry and a moisture-sensitive layer.

4. The humidity detector of claim 1 wherein said humidity sensor comprises a temperature sensor.

5. The humidity detector of claim 4 wherein said humidity sensor comprises an interface for allowing said temperature sensor to be read out by an external system.

6. The humidity detector of claim 1 wherein said cap is formed from a rigid material.

7. A humidity detector for detecting fogging on a window, in particular on a windscreen, comprising
a housing having a bottom side for facing the window and a humidity sensor for detecting a humidity level in ambient air,
a printed circuit board forming at least part of said bottom side, wherein said humidity sensor is arranged at a top side of said printed circuit board and connected thereto,
a cap arranged on top of said humidity sensor and resting on the top side of said printed circuit board, wherein said humidity sensor is located between said printed circuit board and said cap, and
a glider member slideably arranged in said housing and connected to said cap and a biasing member urging said glider member towards said bottom side.

8. The humidity detector of claim 7 wherein said biasing member is a spring arranged between said housing and said glider member.

9. The humidity detector of claim 7 wherein said glider member comprises flexible arms engaging projections and/or recesses on opposite sides of said cap.

10. The humidity detector of claim 1 wherein said printed circuit board is a flexible printed circuit board.

11. A humidity detector for detecting fogging on a window, in particular on a windscreen, comprising
- a housing having a bottom side for facing the window and a humidity sensor for detecting a humidity level in ambient air, and
- a flexible printed circuit board forming at least part of said bottom side, wherein said humidity sensor is arranged at a top side of said printed circuit board and connected thereto.

12. A humidity detector for detecting fogging on a window, in particular on a windscreen, comprising
- a housing having a bottom side for facing the window and a humidity sensor for detecting a humidity level in ambient air, and
- a flexible printed circuit board forming at least part of said bottom side, wherein said humidity sensor is arranged at a top side of said printed circuit board and connected thereto, wherein said flexible printed circuit board extends from a first position at said bottom side below said humidity sensor to a second position at a distance from said bottom side, wherein it is connected to an electronic assembly of said humidity detector at said second position.

13. A method for mounting the humidity detector of any of the preceding claims comprising the step of affixing said humidity detector in a car in a position where said printed circuit board is in contact with the window, in particular wherein a surface of said printed circuit board opposite the humidity sensor is in contact with the windscreen.

\* \* \* \* \*